United States Patent [19]

Best

[11] 4,319,079
[45] Mar. 9, 1982

[54] CRYPTO MICROPROCESSOR USING BLOCK CIPHER

[76] Inventor: Robert M. Best, 16016 - 9th Ave. NE., Seattle, Wash. 98155

[21] Appl. No.: 113,071

[22] Filed: Jan. 17, 1980

Related U.S. Application Data

[63] Continuation-in-part of Ser. No. 75,120, Sep. 13, 1979, abandoned.

[51] Int. Cl.³ ............................................. H04L 9/00
[52] U.S. Cl. ............................ 178/22.09; 178/22.05
[58] Field of Search ............................ 178/22; 375/2

[56] References Cited

U.S. PATENT DOCUMENTS

| | | | |
|---|---|---|---|
| 3,798,605 | 3/1974 | Feistel | 178/22 |
| 3,958,081 | 5/1976 | Ehrsam et al. | 178/22 |
| 4,074,066 | 2/1978 | Ehrsam et al. | 178/22 |
| 4,157,454 | 6/1979 | Becker | 178/22 |
| 4,218,738 | 8/1980 | Matyas et al. | 178/22 |
| 4,246,638 | 1/1981 | Thomas | 178/22 |

Primary Examiner—S. C. Buczinski
Attorney, Agent, or Firm—Seed, Berry, Vernon & Baynham

[57] ABSTRACT

A cryptographic microprocessor for processing data and executing programs which are stored in enciphered blocks to prevent unauthorized alteration and copying. Such a "crypto-microprocessor" deciphers the enciphered program and data blocks piecemeal as execution of the deciphered program proceeds. A product block cipher circuit makes each bit of a deciphered block a complicated function of each bit of an enciphered block, and each bit of an encryption key, and each bit of the digital address of the enciphered block. Combined use of block and byte deciphering is described. If a block of the enciphered program is altered, the crypto-microprocessor temporarily or permanently disables itself.

16 Claims, 9 Drawing Figures

CRYPTO MICROPROCESSOR USING BLOCK CIPHER

CROSS REFERENCE TO RELATED APPLICATIONS

This application is a continuation-in-part of the co-pending application of Robert M. Best entitled "CRYPTO MICROPROCESSOR USING BLOCK CIPHER" Ser. No. 075,120, filed Sept. 13, 1979, now abandoned.

This application is also related to application Ser. No. 06/044,952, filed June 4, 1979, entitled "CRYPTO MICROPROCESSOR FOR EXECUTING ENCIPHERED PROGRAMS".

BACKGROUND OF THE INVENTION

1. Technical field of the Invention

This invention relates generally to cryptographic devices, and more particularly to cryptographic microprocessors for preventing alteration of computer programs and data.

2. Description of the Prior Art

Prior-art methods of computer and data security have been concerned mostly with secure transmission and storage of data outside of a computer and design of computer systems which resist penetration from the outside. The problem of preventing intrusion by technicians who have legitimate access to the internal wiring of a computer, has received little attention. Technicians who routinely maintain microcomputers and replace defective circuit boards can introduce unauthorized patches to system programs to circumvent security features. Increasing use of microcomputers by banks, small businesses, and in data communication networks has made security of microprocessor programs an urgent concern.

If access to sensitive data is controlled by a program which an intruder can alter, then both the data and programs are exposed to tampering. Without adequate means for preventing such intrusion, the risk to microcomputer owners may become excessive. Sustained growth of the microcomputer industry may therefore depend on preventing program alteration.

One prior-art method to certify that a program has not been altered is to compute cryptographic check sums for a program and compare the results with a previous prepared list of check sums. But an intruder with access to internal wiring can introduce circuitry which does not disrupt computing of check sums, but does alter execution of a program which processes sensitive data. The program or circuit which computes check sums can itself be altered to always give expected results.

To prevent an intruder from learning the detailed instructions of a program and to prevent execution of part of a program in unauthorized microprocessors, an intruder should be prevented from disassembling the program.

Various prior-art encryption systems have been developed to provide data security within data processing systems, during transmission over data communications networks, and during storage on media such as magnetic tape and disc. An example of such an encryption system may be found in U.S. Pat. No. 3,958,081 which was adopted as a standard by the National Bureau of Standards in January 1977 and is now commonly called the Data Encryption Standard (DES). The DES enciphers and deciphers data in blocks of 64 bits as a function of a secret 56-bit key. DES requires 16 iterations of processing during which every bit in the enciphered output block becomes a complicated function of every key bit and every bit in the plain unenciphered block.

U.S. Pat. No. 4,074,066 describes an improvement to DES for chaining enciphered data blocks so that a block is enciphered differently in different parts of the chain even though the key and data remain the same. This prevents an intruder from substituting one block for another in a data transmission.

Preventing such block substitution is also a problem when enciphered data is stored in blocks that are accessed "randomly". An intruder must be prevented from substituting one block for another to induce a cryptographic microprocessor to execute valid deciphered instructions in an unauthorized sequence or to induce it to decipher an unauthorized block of data in lieu of an authorized block. The block chaining method described in U.S. Pat. No. 4,074,066 is designed for sequential data transmission and is therefore not suitable for non-sequential "random" access as required by an executing microprocessor.

SUMMARY OF THE INVENTION

A cryptographic apparatus that executes an enciphered program. A deciphering circuit deciphers a block of the enciphered program. An execution circuit executes instructions which are included in some of the deciphered blocks. The address of each block controls part of the deciphering process.

DETAILED DESCRIPTION OF THE INVENTION

Figure 2:
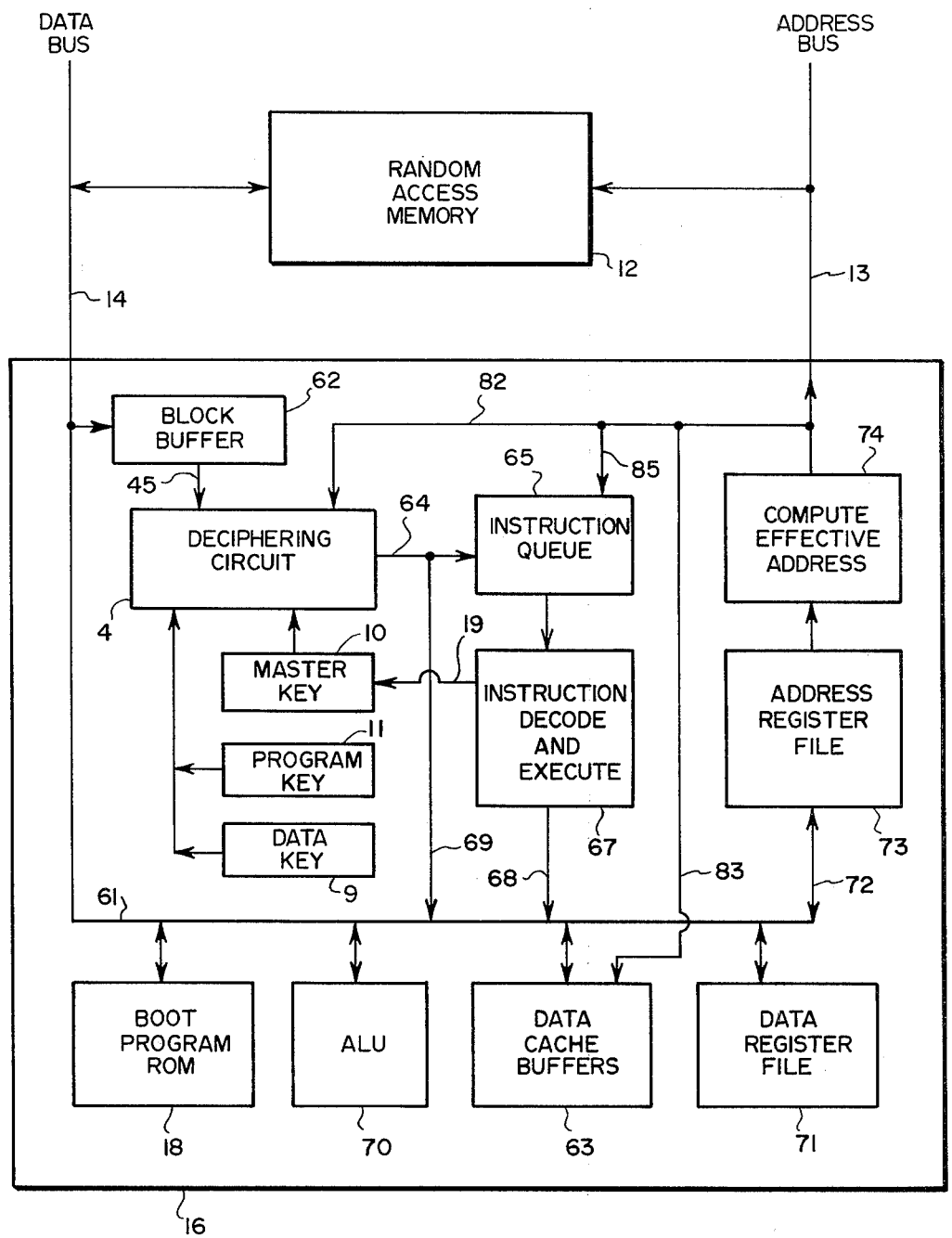
FIG. 2 is a block diagram of a cryptographic microprocessor which includes the block cipher circuit of FIG. 1 or FIG. 3.

A cryptographic microprocessor (CMP) executes an enciphered program stored in an external memory by piecemeal deciphering of enciphered instructions and data as they are addressed by the executing program. With reference to FIG. 2, a typical CMP is shown generally at 16. CMP 16 executes the enciphered program stored in external memory 12 by addressing a block of the enciphered program via address bus 13, and by deciphering the addressed block in deciphering circuit 4. The program's deciphered instructions are temporarily stored in queue 65, and are subsequently decoded and executed by prior-art circuit 67. "Decode" is used in the conventional non-cryptographic sense. "Deciphering" is used in the conventional sense of cryptographically transforming. Each conventional instruction has an executable portion or operation code. Instructions may have address and/or data portions. Data may be included with instructions in the deciphered blocks. Deciphered blocks may also include cryptographic check digits for validating the remaining bits in a deciphered block.

Figure 1:
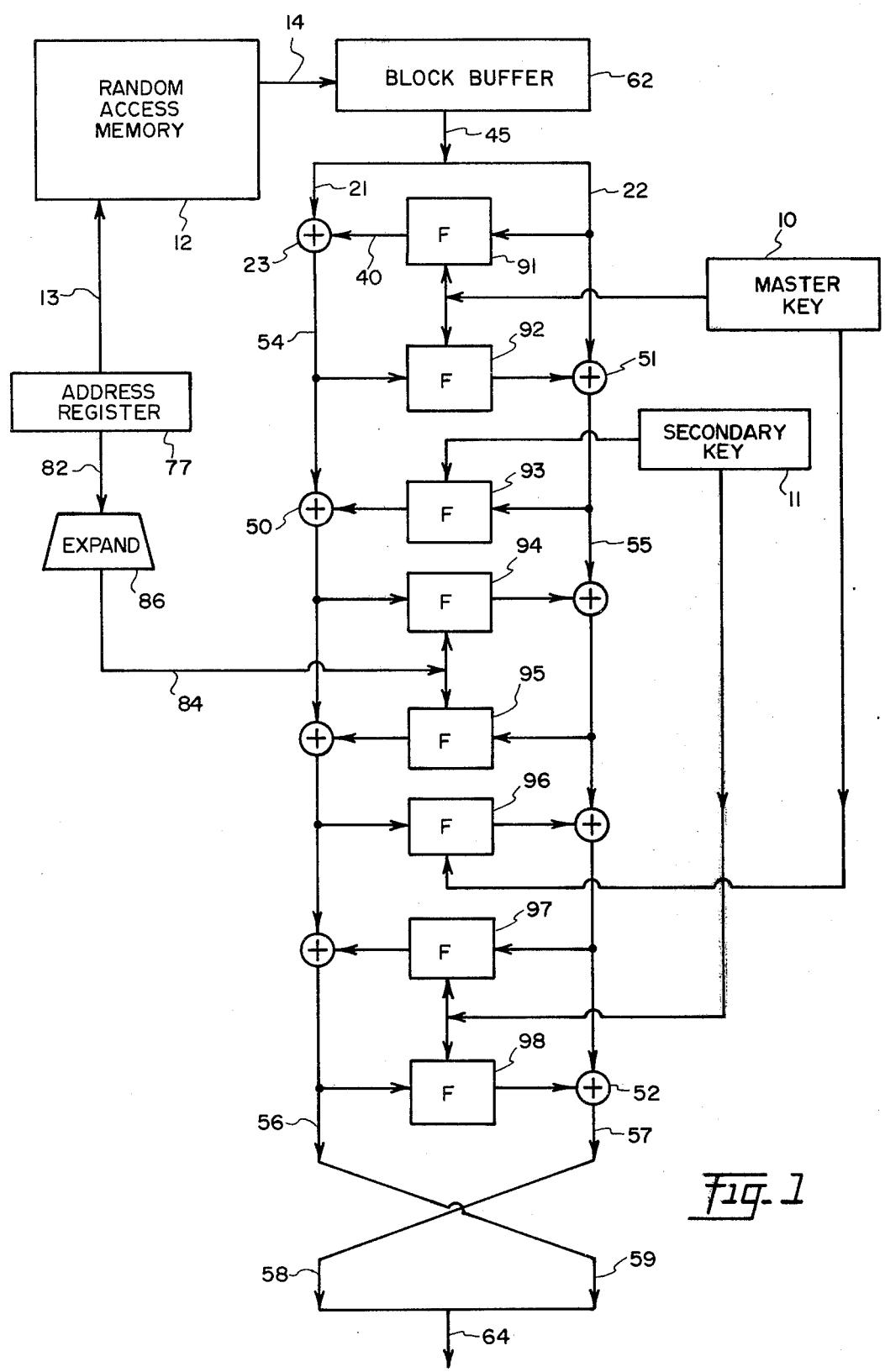
FIG. 1 is a diagram of a product block cipher circuit which enciphers and deciphers an information block in eight iterations.
Figure 3:
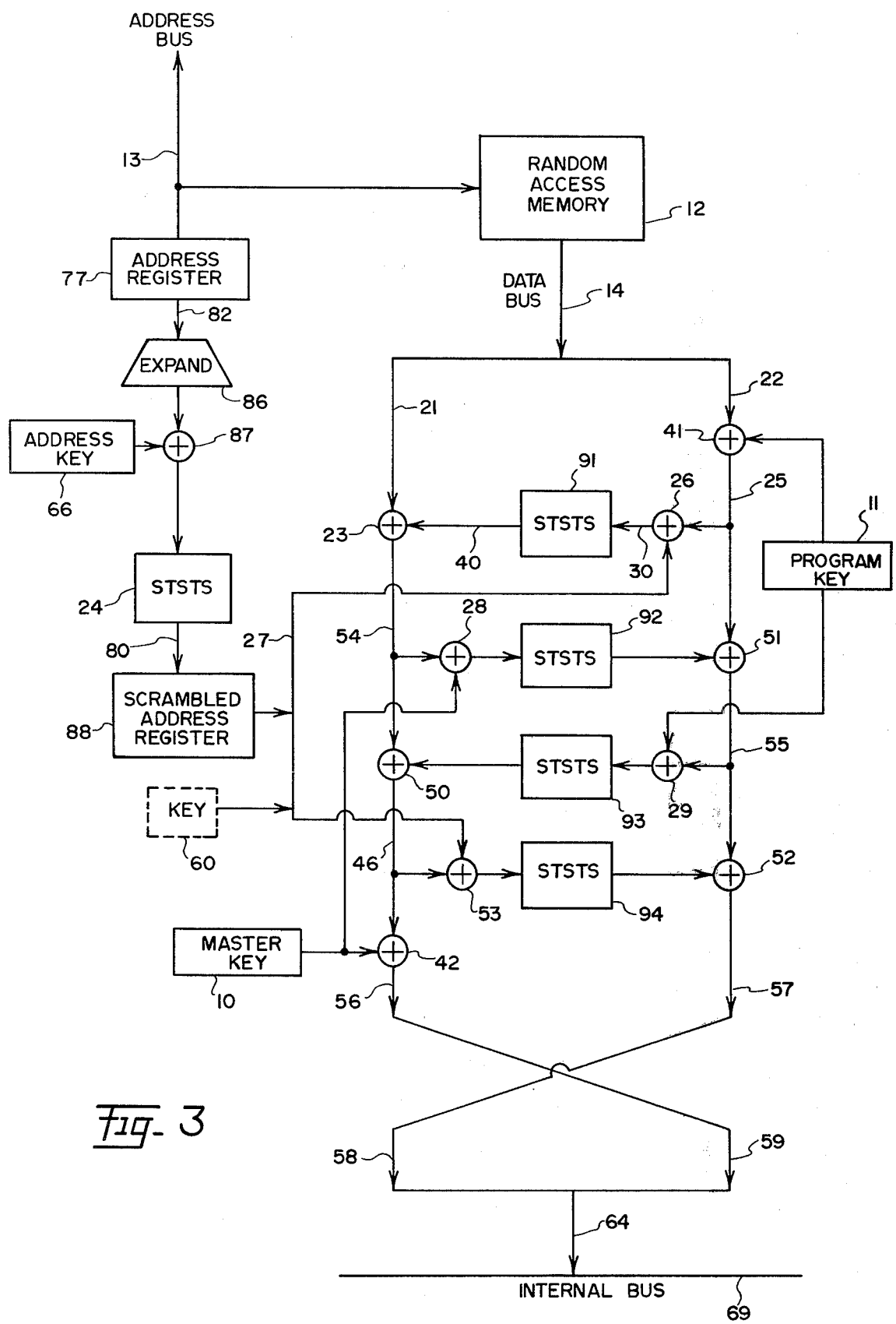
FIG. 3 is a diagram of a product block cipher circuit which enciphers and deciphers an information block in four iterations.
Figure 5:
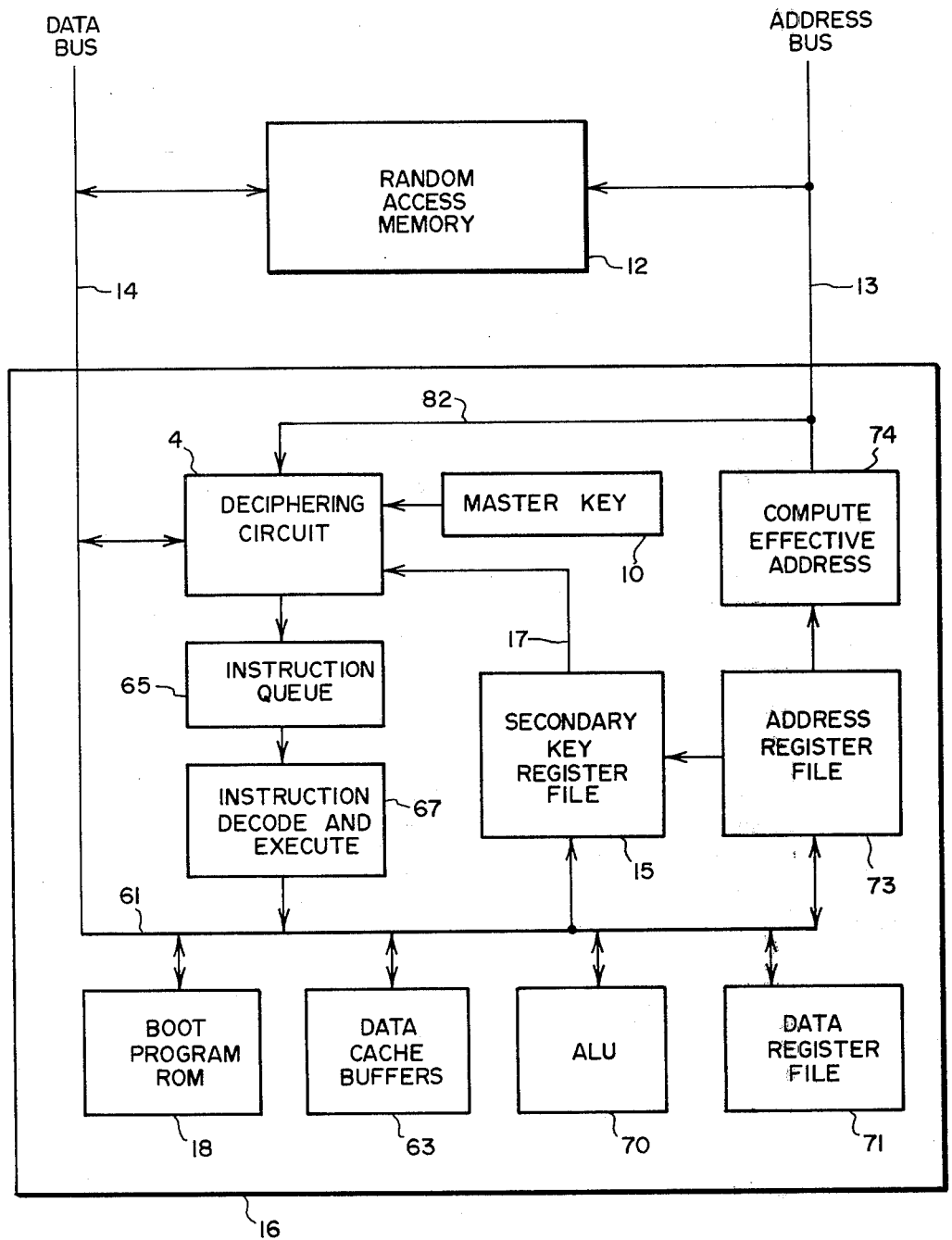
FIG. 5 is a block diagram of a cryptographic microprocessor which includes a file of secondary keys for automatic key management.
Figure 6:
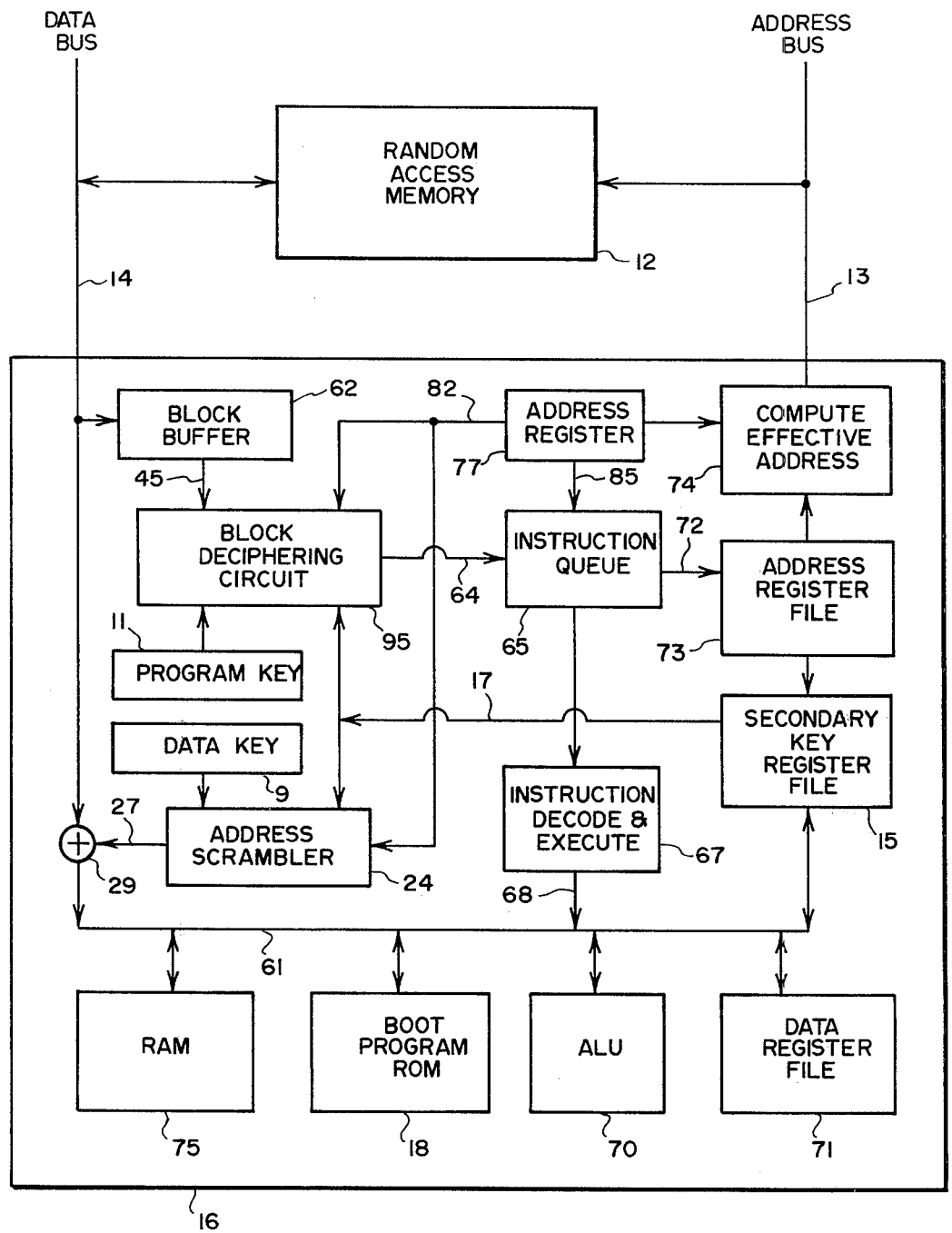
FIG. 6 is a block diagram of a cryptographic microprocessor which includes both block deciphering and byte deciphering circuitry.

Deciphering circuit 4 also deciphers blocks of the program's enciphered data for further processing by the deciphered instructions executed in CMP 16. Circuit 4 may also encipher blocks of plain data on bus 61 for outputting to external storage and/or data communication devices. Alternative embodiments of deciphering circuit 4 are shown in FIGS. 1 and 3. Alternative embodiments of CMP 16 are shown in FIGS. 5 and 6 which include corresponding files of key registers 15 and address registers 73.

CMP 16 includes conventional microprocessor elements such as instruction decode and execute circuitry 67, arithmetic/logic unit (ALU) 70, register files 71 and 73, and instruction queue 65. Queue 65 may store the instruction being executed and additional instructions which are deciphered in advance of their being needed for execution. Portions of the deciphered instructions stored in queue 65 include operation codes which are decoded by circuit 67, immediate data which is passed via buses 68 and 61, and address portions which are passed via bus 72 to a conventional address register file 73. This file may include base, segment, page, block, word and/or byte addresses from which circuit 74 computes an effective address for outputting onto bus 13. A block address is passed via bus 82 to deciphering circuit 4.

Physical security of CMP 16 may be provided by constructing CMP 16 as a heavily glassified integrated circuit chip.

Deciphering within circuit 4 is controlled by one or more encryption keys such as master key 10, program key 11, and data key 9. Each key is stored in a register which may be volatile or non-volatile. Program key 11 controls deciphering of blocks of the program's instructions. Data key 9 controls deciphering (and perhaps enciphering) of data which is processed by executing the deciphered instructions under control of circuit 67. Program key 11 and data key 9 should be assigned different values so that a program cannot read and decipher itself as data.

Several secondary keys may be used for enciphering and deciphering different groups of data blocks and/or deciphering different programs. Intermediate results of executing deciphered instructions and processing data can be temporarily stored in cipher in external memory 12 using additional secondary keys. CMP's can communicate with each other in cipher via a common random-access writable memory using still other secondary keys.

When CMP 16 begins execution it may fetch its first several instructions from a bootstrap program stored in read-only memory (ROM) 18). Subsequently, CMP 16 obtains instructions from the program stored in memory 12 in enciphered blocks. Blocks of this program, which may be accompanied by blocks of enciphered data also stored in memory 12, are read into CMP 16 by addressing the bytes or words of a block via address bus 13, thereby causing memory 12 to output each addressed byte or word onto bus 14. Each byte or word in a block has a digital address which is specified on external address bus 13 by circuit 74. Each block of enciphered information in memory 12 has a digital address which is specified on internal bus 82.

The block address on bus 82 controls part of the deciphering process in circuit 4 as described below. The low-order bits of the effective address computed by circuit 74, which specify which byte or word in a deciphered block is being addressed, are conveyed internally on bus 83 to cache buffer 63 for data, and on bus 85 for instructions in queue 65.

Each block may consist of 64 bits, 48 bits or other convenient sizes. The number of bits in each block is sufficiently large to make it impractical for an intruder to try every bit combination. A block of 64 bits is used for illustrative purposes in the following description. "Byte" is used in a broad sense and may include 8 bits, 16 bits or other small groups of bits.

Memory 12 may be any of a variety of conventional storage devices, such as writable random-access memory (RAM) or read-only memory (ROM), and may include buffer memory into which the enciphered program has been read from storage media such as magnetic disc or tape, optically-coded discs, or magnetic bubble domain memory.

Each block of enciphered information is input piecemeal on bus 14 to block buffer 62 which may hold more than one block awaiting deciphering by circuit 4. When deciphering circuit 4 cryptographically transforms a block of enciphered instructions, the deciphering process is controlled by the block address on bus 82 and by keys 10 and 11. The resulting block of deciphered instructions is stored via bus 64 into instruction queue 65. If the next successor instruction is present in queue 65, it is fetched by decoder 67 from queue 65. If the next instruction is not in queue 65, the digital address of the block on enciphered information which includes the next successor instruction is specified on bus 13 by circuit 74 and on bus 82.

When deciphering circuit 4 transforms a block of enciphered data, the deciphering process is controlled by the block address on bus 82 and by keys 9 and 10. The resulting block of deciphered data is stored via bus 69 into conventional cache buffer 63. Further access to data in a deciphered block is made directly from cache buffer 63 to bus 61 by addressing cache buffer 63 with address bus 83. This avoids redundant deciphering. If a byte of deciphered data in buffer 63 is altered by the program, the entire block may be reenciphered by circuit 4 and the enciphered block stored back into memory 12. Data which is output in cipher to external memory 12 passes from buffer 63 via bus 61 to buffer 62 for enciphering. Circuit 4 may be switched to an enciphering mode to produce an enciphered block or may encipher by the same process used for deciphering. The enciphered block is output via buses 69, 61 and 14 to external memory 12 or to another storage device addressed by bus 13.

Plain unenciphered data may be read and written in the conventional manner via buses 14 and 61. Regions of address space may be reserved for reading and writing plain data. Fetching of executable instructions from such a plain data region should be inhibited. Unenciphered instructions may be fetched from internal read-only memory (ROM) 18 which may include a "bootstrap" program which is executed whenever power is turned on. Security kernel programs may also be stored in ROM 18.

During deciphering by circuit 4, each bit of the enciphered block affects all bits of the deciphered block. Hence an intruder is prevented from tricking the CMP into executing slightly altered instructions, because changing any bit of an enciphered block produces a deciphered block of meaningless bits. By including one or more self-disabling operation codes in the CMP's instruction set, an intruder is automatically defeated in attempts to alter instructions. The meaningless block of bits produced by such alteration will include occasional disabling instructions which, when executed, cause the CMP to be incapable of regular processing. Program alteration may also be prevented by check bits in each block.

Figure 9:
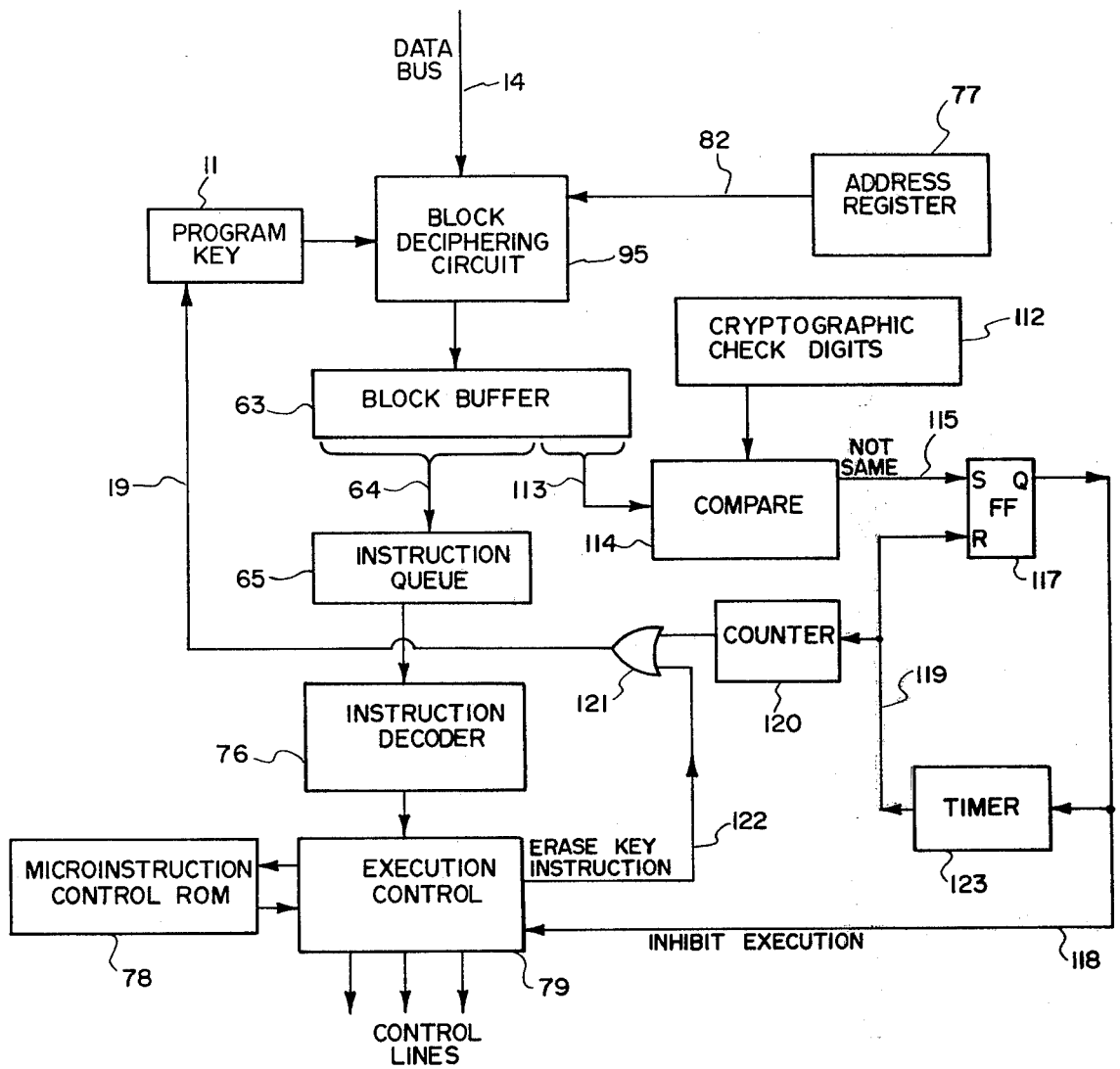
FIG. 9 is a diagram of a circuit for disabling a cryptomicroprocessor.

Referring to FIG. 9, the length of time during which CMP 16 is disabled may be controlled by timer 123 included in CMP 16. When invalid check bits 113 are detected in buffer 63 by comparator 114, non-volatile flip-flop 117 is set which starts timer 123 and temporarily inhibits execution. When timer 123 overflows, flip-flop 117 is reset and normal execution resumes. The inhibited period may be hours or days in length. Removing power or resetting the registers in CMP 16 should not reset flip-flop 117. Each time an inhibited period ends, counter 120 may be incremented by line 119. When counter 120 overflows, line 19 is enabled which erases one or more keys. Alternatively, overflow of counter 120 may cause execution of instructions in a security program in ROM 18 which includes disabling instructions. A disabling instruction on line 122 may erase key 11 to permanently disable CMP 16 or may set flip-flop 117 so that disabling is temporary.

KEY MANAGEMENT

Some keys such as master key 10 are stored into CMP 16 by the proprietor of the enciphered program and remain fixed thereafter. Other keys such as program key 11 and data key 9 may be changed internally by CMP 16 as execution proceeds from one program segment to another or from one region of data to another. The program instructions which change the keys in the key registers may be stored in ROM 18 to prevent tampering. Multiple secondary keys may be used so that a different key is used for each region or segment of address space. Each such region or segment may contain one or more blocks or bytes of enciphered information.

Referring to FIG. 5, a file of secondary key registers 15 is associated with a corresponding set of segment address registers in file 73. Whenever a block in memory 12 is addressed, a specific address register R in file 73 is used by circuit 74 to compute the effective address on bus 13. Corresponding to segment R is secondary key K in key register file 15 which is gated to deciphering circuit 4 via bus 17. When the addressed block is input on bus 14 and deciphered by circuit 4, key K on bus 17, master key 10, and the block address on bus 82 control the deciphering process.

Secondary keys may be stored into register file 15 from information deciphered using previous secondary keys. Some secondary keys may remain inactive in ROM 18 until a password or other input is processed by CMP 16. In a consumer product, for example, a retailer may input into CMP 16 a password for each software feature that the end user has paid for. Each password may activate a secondary key for the corresponding segment of memory 12. Keys should not be accessible to retailers.

Authorized patches to the enciphered program may be stored in memory 12 with a block address and encryption key consistent with the program being patched. Alternatively, an authorized patch may be enciphered with a unique key which is stored into key register file 15 by a security kernel routine in ROM 18.

In systems which use multi-level security, separation of levels may be enforced by using different secondary keys to encipher program instructions and data at different levels. Instructions can transfer control to other instructions in the same level because the secondary keys for deciphering current level information are present in register file 15. But a deciphered program does not have access to higher or lower levels. Transfer of control and data between levels is performed by special instructions which invoke the kernel program. In such a system, key register file 15 is accessible only to kernel instructions fetched from ROM 18. Any attempt to force execution to a higher level by substituting block on bus 14 will result in erroneous deciphering by circuit 4 producing meaningless bits in queue 65.

PRODUCT BLOCK CIPHERS

An intruder should not be able to decipher a block which has been substituted for another block even though the same keys apply to both blocks. Block substitution can be prevented by altering the encryption key for each block address, so that each block is enciphered with a different altered key. The block address may be exclusive-ORed with master key 10 to produce an altered key for use by deciphering circuit 4. This method is disclosed in copending application Ser. No. 044,952 filed June 4, 1979.

In the present invention deciphering of substituted blocks is prevented by involving the bits of the block address on bus 82 in the deciphering process in a manner similar to the way that key bits are involved. The result of this involvement is that every bit of the deciphered block is a complicated function of every bit of the block address and every bit of key. This provides a polyalphabetic block cipher where the number of "alphabets" is as large as the number of addressable blocks, and the number of possible blocks in each "alphabet" is too large to tabulate.

DESCRIPTION OF FIG. 1

Referring to FIG. 1, an embodiment is shown of deciphering circuit 4 which deciphers a 64-bit enciphered block in buffer 62 using 8 rounds or iterations of processing. The 64-bit block in buffer 62 is split into two halves on buses 21 and 22. The 32-bit registers which store such partially processed data are omitted in FIG. 1 for clarity. The half-block on bus 22 is transformed by the F junction (box 91) controlled by master key 10 to form a substitute half-block on bus 40. The 32 bits on bus 40 are exclusive-ORed in gates 23 to the 32 bits on bus 21 to produce a modified half-block on bus 54. Thus the left half of the block is modified by a complicated function of the right half of the block under control of the master key. Similarly, each iteration of function F is applied alternately to the left half and right half. The left and right half-blocks are interchanged after the eighth iteration. The deciphered block emerges from the eighth iteration on bus 64.

Function F (boxes 91 through 98) is a non-linear substitution circuit such as that detailed in U.S. Pat. No. 3,958,081 (DES). Keys 10 and 11 each may consist of 48 bits to conform to the key size required by the function F in DES. The eight iterations of function F and their associated exclusive-OR gates are similiar to the first eight iterations of DES. Function F in DES includes segmenting each 32-bit argument into 8 half-bytes, expanding each 4-bit half-byte to 6 bits by duplicating bits from adjacent half-bytes, exclusive-ORing the 48 expanded bits to 48 bits of key, substituting groups of 6 bits using table lookup in fixed publicly-known tables, and transposing (permuting) the substitute bits according to a fixed transposition matrix.

Unlike DES, one or more of the eight iterations in FIG. 1 are controlled by the address of the block being deciphered. This address is stored in register 77 and controls the fourth and fifth iteration (F-boxes 94 and 95) in FIG. 1. If a block of information in memory 12 is relocated or moved to a different block address, an attempt to decipher that block results in a block of meaningless bits on bus 64.

The 48 bits which control F-boxes 94 and 95 may be derived, with or without modification, from the block address on bus 82 by using some address bits more than once. This bit duplication is done by expansion box 86. For example, a 24-bit address on bus 82 can be expanded to 48 bits on bus 84 by using each address bit twice; once in each half of the bits on bus 84. A 24-bit address on bus 82 may omit the two or three low-order bits in address register 77 and external address bus 13 because the address on bus 82 represents the entire 64-bit block in buffer 62 which may be addressed as bytes or words on bus 13. Expansion box 86 may include a product block cipher circuit so that each bit on bus 84 is a complicated function of every address bit on bus 82.

The deciphering circuit shown in FIG. 1 may be used for enciphering a block on bus 45 by interchanging the two keys 10 and 11 between their respective registers.

The 8 iterations shown in FIG. 1 may be accomplished in 4 clock cycles by performing two consecutive iterations in each clock cycle. Duplicate logic for box 91 and box 92 may be used so that both boxes operate in parallel. Whenever standard 16-cycle DES is required for data, the F-boxes may be used in the standard manner.

FOUR CYCLE BLOCK CIPHER

The 16 iterations in DES cannot be shortened to 4 iterations because DES builds its strength gradually and requires several iterations to resist "tickling" with chosen bit patterns. If a block encryption circuit builds strength rapidly, fewer cycles are needed.

Referring to FIG. 3, a block encryption circuit is shown which uses four iterations to decipher or encipher a block of 64 bits. The block is split into two halves and a complicated function of each half is exclusive-ORed to the other half. This is done alternately right to left, then left to right as described above for FIG. 1. But unlike FIG. 1 or DES, every bit of product data emerging from boxes 91-94 in FIG. 3 is a complicated non-linear product-block-cipher function of every bit of the multiple-bit argument data presented as input to boxes 91-94.

For instance, box 91 provides on bus 40 a complicated function of the 32 argument bits on bus 30. This cipher method is named STSTS because five steps of alternating substitution and transposition are used. This method is described below with reference to FIG. 4. The argument bits on bus 30 are the exclusive-OR sum of the half-block bits on bus 22, and the bits of program key 11, and the scrambled-address bits on bus 27.

This scrambled address is a complicated function of the block address in register 77. The block address is expanded in box 86 to 32 bits, exclusive-ORed in gates 87 to the secret address key 66 and scrambled by STSTS box 24 using the same circuitry as used in boxes 91-94. The scrambled address bits on bus 80 are stored in register 88 and are used in gates 26 and 53 to control operation of STSTS boxes 91 and 94.

The enciphered block on buses 21 and 22 is modified by STSTS boxes 91 and 92 and by the associated exclusive-OR gates 41, 26, 23, 28, and 51, to produce partially modified substitute data on buses 54 and 55. This substitute data is then further modified by the last two iterations of STSTS (boxes 93 and 94). The half block on bus 46 is further modified by key 10 in exclusive-OR gates 42. The half blocks on buses 56 and 57 are interchanged on buses 58 and 59 so that an enciphered block on bus 64 may be re-input on bus 14 for deciphering.

The second and third iterations (boxes 92 and 93) are controlled by master key 10 and program key 11 respectively. In situations where the block cipher on bus 64 is independent of the block address, they key 60 may be substituted for the scrambled address on bus 27.

The fourth iteration (box 94) is controlled by the scrambled address at exclusive-OR gates 53. In three-iteration embodiments, this fourth iteration may be omitted.

To change from deciphering to enciphering, keys 10 and 11 are interchanged between their respective registers in four-iteration embodiments. In three-iteration embodiments, the key and scrambled-address bits are used in gates 41, 26, 28, 29 and 42 during deciphering in a sequence which is the reverse of that used for enciphering.

STSTS PRODUCT BLOCK CIPHER

Figure 4:
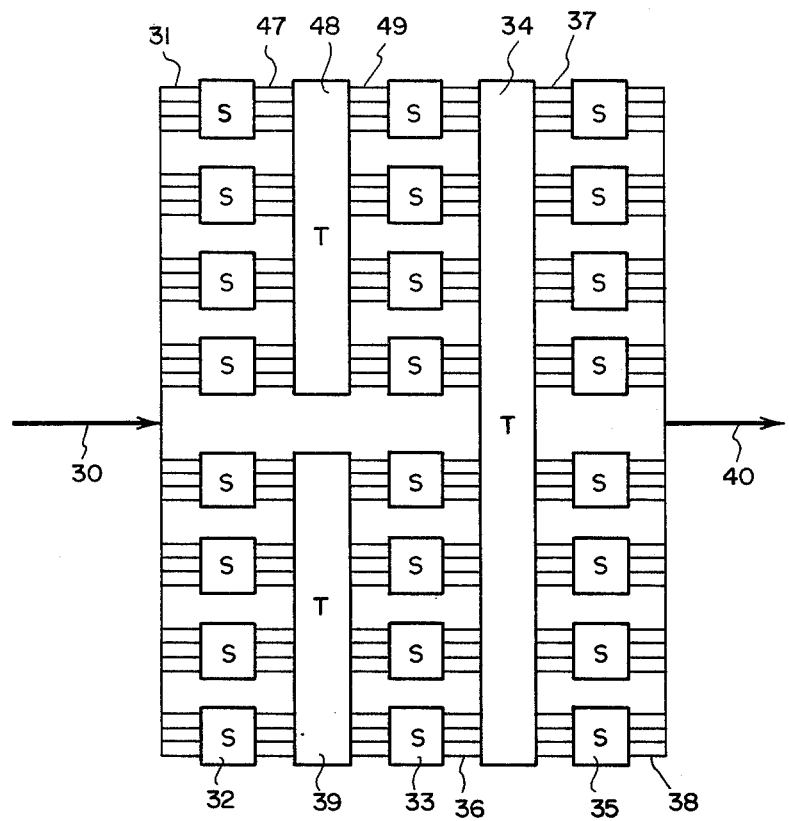
FIG. 4 is a block diagram showing the details of the STSTS boxes in FIG. 3.

Referring to FIG. 4, the STSTS block cipher circuit consists of five steps of alternating substitution and bit transposition. The 32-bit block on bus 30 is divided into eight half-bytes of four bits each. Each half-byte addresses a small substitution table (S-box) of read-only memory. Each S-box 32, 33 and 35 provides a table-lookup of a 4-bit integer in a table of 16 integers. These integers may be quasi-random permutations of the integers "0000" through "1111" (binary) in each table, or may be randomly generated bits. The tables need not be invertible. Tables which are strongly non-affine should be used. Subsets of the S-boxes defined for DES are suitable for those in FIG. 4. S-box contents may be secret or publicly known.

Sandwiched between S-boxes 32 and 33 are columnar transposition (T-boxes) 39 and 48 in which one bit output from each S-box 32 is input to each S-box 33. Similarly T-box 34 is sandwiched between S-box stages 33 and 35.

The S-boxes 32 cause each bit on bus 30 to affect four bits on lines 47. T-boxes 39 and 48 spread these four bits to four S-boxes 33. Thus each bit on bus 30 affects four S-boxes 33. The four bits from each S-box 33 are spread by T-box 34 to four S-boxes 35. Each S-box 35 is affected by two S-boxes 33 connected to T-box 39 and two S-boxes 33 connected to T-box 48. Thus each bit on bus 40 is a function of every bit on bus 30. Conversely each bit on bus 30 affects every bit on bus 40.

USING BOTH BLOCK AND BYTE CIPHERS

Referring to FIG. 6, an embodiment of CMP 16 is shown which uses two types of deciphering: block deciphering for enciphered program instructions and byte deciphering for enciphered data.

Block deciphering (circuit 95 which is detailed in FIG. 7) is advantageous for program instructions because altering any bit of an enciphered block results in a deciphered block of meaningless bits in instruction queue 65. If a block of 64 bits is used in buffer 62, an intruder is prevented from trying all bit combinations on bus 14 in an attempt to induce unauthorized processing. Block deciphering and enciphering may be used for data which requires high security; for example, data which contains encryption keys. Cache buffering may be omitted if block deciphering of data is used infrequently.

Byte deciphering is advantageous for protecting data, because cache buffering and additional clock cycles are not required for deciphering if each byte is deciphered separately from other bytes. A polyalphabetic byte deciphering circuit is used in FIG. 6 consisting of address scrambler 24 (detailed in FIG. 8) which transforms the byte address on bus 82 to produce a scrambled address on bus 27. This scrambled address is exclusive-ORed in gates 29 to the addressed data byte on bus 14 to produce a deciphered byte on internal bus 61. Byte deciphering is further described below with reference to FIG. 8.

Figure 7:
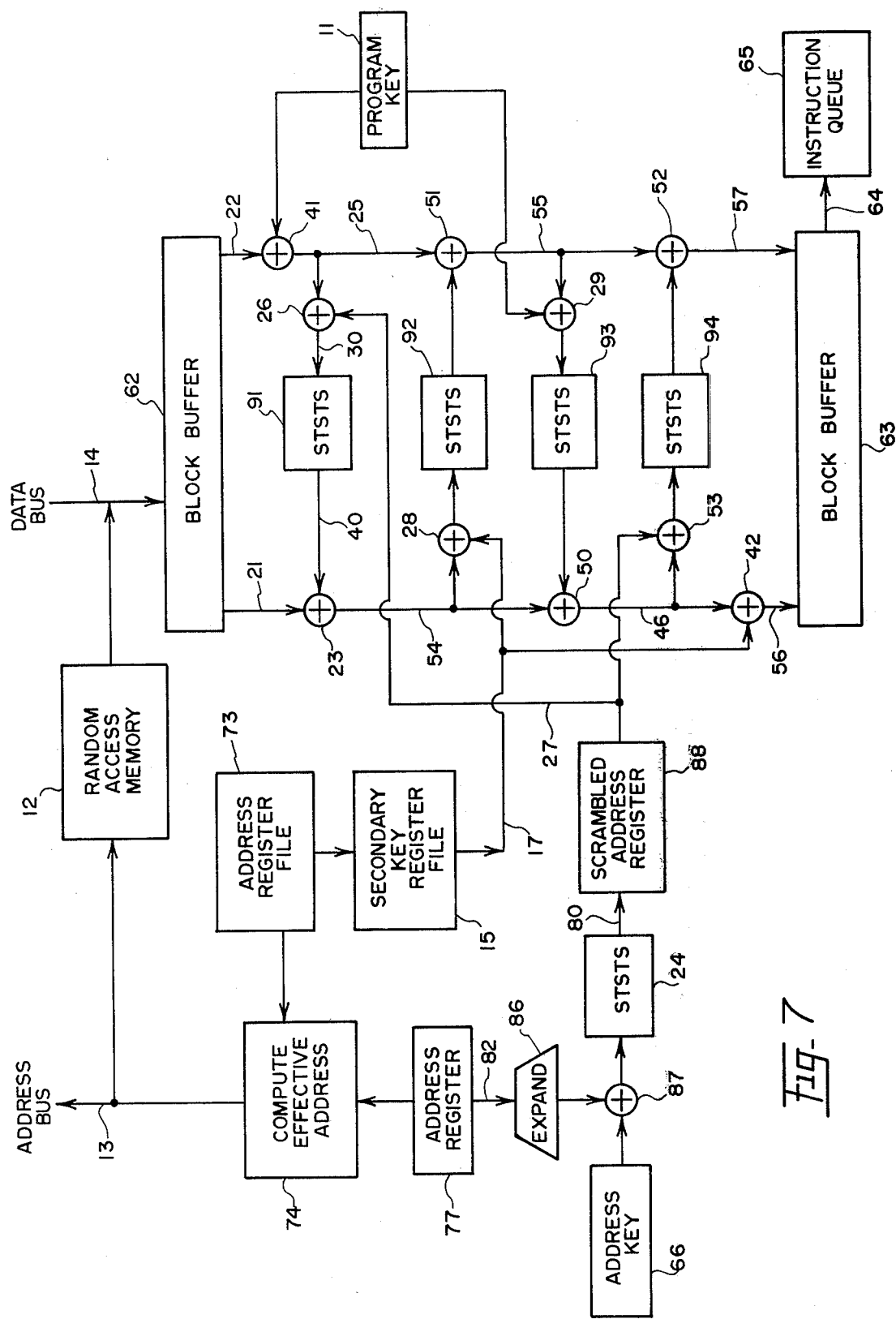
FIG. 7 is diagram of a product block cipher circuit for deciphering program instructions.

Referring to FIG. 7, a four-iteration circuit is shown for deciphering a 64-bit block of instructions. A block of enciphered instructions in memory 12 is addressed by bus 13 and is read via bus 14 into buffer 62 for deciphering. The address on bus 13, in this embodiment, is computed by circuit 74 by adding a base or segment address in file 73 to an address offset in register 77. The deciphering process performed by STSTS boxes 91 through 94 is described above for FIG. 3. The resulting deciphered block in buffer 63 includes multiple instructions which are stored in queue 65 to await decoding and execution.

The deciphering process is controlled by three keys: program key 11 and address key 66 which may remain constant for all portions of the program, and a secondary key K in file 15 associated with the segment address register R in file 73 used by circuit 74. Operation of key register file 15 and address register file 73 is described above in the section on key management. Address key 66 and program key 11 are discussed above with reference to FIG. 3.

Figure 8:
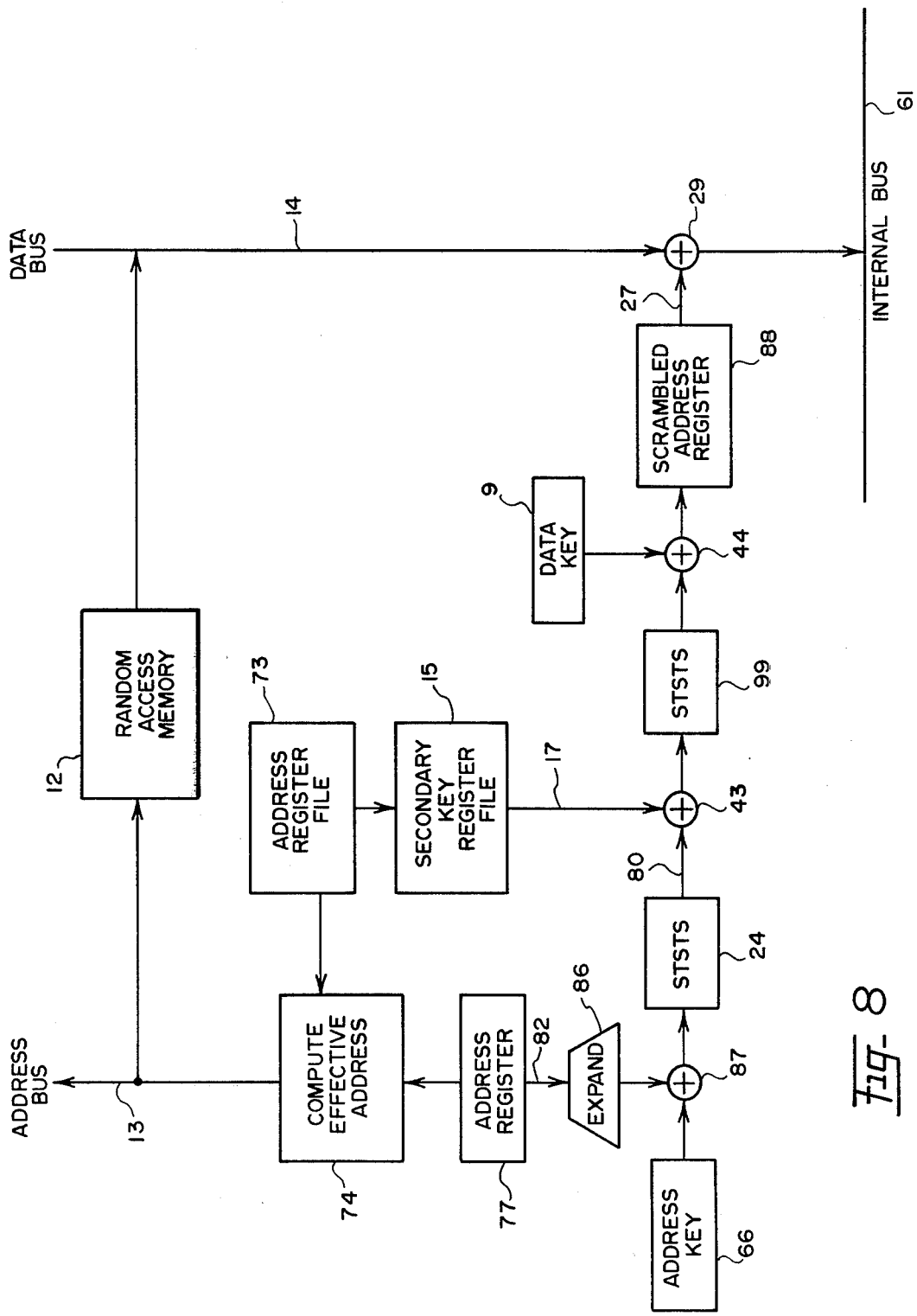
FIG. 8 is a diagram of a polyalphabetic cipher circuit for deciphering bytes of data.

Referring to FIG. 8 a byte-deciphering circuit is shown which produces a scrambled address on bus 27. This scrambled address is a function of three keys: address key 66, data key 9, and a secondary key on bus 17. The circuitry for computing the scrambled address on bus 80 may be the same as described above for block deciphering in FIG. 3. In FIG. 8 the scrambled address on bus 80 is further exclusive-ORed in gates 43 to the secondary key on bus 17, further transformed as a block by STSTS box 99, and exclusive-ORed in gates 44 to data key 9 to produce a thoroughly scrambled address in register 88. This scrambled address on bus 27 is exclusive-ORed to the addressed byte on bus 14 to produce a deciphered byte on bus 61.

Although I have described the preferred embodiments of my invention with a degree of particularity, the present disclosure is made only by way of example. Equivalent embodiments which do not depart from the scope and spirit of my invention may occur to those skilled in the art in the light of this disclosure.

I claim:

1. A cryptographic apparatus for executing a computer program of instructions stored in enciphered form as a plurality of addressable blocks of enciphered program information, each block being stored at a location specified by a digital address, the apparatus comprising:
   means for storing an encryption key;
   means for specifying a first digital address of a block of said enciphered program information, thereby addressing the block;
   product block deciphering means for transforming in a plurality of steps said addressed block of enciphered program information to produce a block of deciphered information including an executable instruction and a second digital address, at least one step in said plurality of steps being controlled by said first digital address, and at least one step in said plurality of steps being controlled by said encryption key;
   means for decoding and executing an instruction included in a block of said deciphered information; and
   means for specifying the second digital address in said block of deciphered information so as to address a successor block of said enciphered program information which includes a successor instruction in enciphered form for deciphering by said deciphering means.

2. A cryptographic apparatus for executing a computer program of instructions stored in enciphered form as a plurality of addressable portions of enciphered information, each portion being stored at a location specified by a digital address, the apparatus comprising:
   address register file means for storing a plurality of digital addresses, each address corresponding to at least one portion of said enciphered information;
   key register file means for storing a plurality of encryption keys, each key correponding to a digital address in said address register file;
   means for addressing a first portion of said enciphered information using a first digital address in said address register file;
   deciphering means for cryptographically transforming said addressed portion of enciphered information to produce a portion of deciphered information under control of the encryption key in said key register file corresponding to said first digital address, the portion of deciphered information including an executable instruction and a second digital address;
   means for executing an instruction included in a portion of said deciphered information; and
   means for addressing a successor portion of enciphered information for deciphering by said deciphering means in accordance with said second digital address.

3. A cryptographic apparatus for processing enciphered data and executing a computer program of instructions stored in enciphered form as a plurality of addressable portions of enciphered information, each portion being stored at a location specified by a digital address, the apparatus comprising:
   address register file means for storing a plurality of digital addresses, each address corresponding to at least one portion of said enciphered information;

key register file means for storing a plurality of encryption keys, each key corresponding to a digital address in said address register file;

means for addressing a first portion of said enciphered information using a first digital address in said address register file;

means for addressing a second portion of said enciphered information using a second digital address in said address register file;

deciphering means for cryptographically transforming said first addressed portion to produce a first portion of deciphered information under control of the encryption key in said key register file corresponding to said first digital address, the the first portion of deciphered information including an executable instruction and a third digital address;

deciphering means for cryptographically transforming said second addressed portion to produce a second portion of deciphered information under control of the encryption key in said key register file corresponding to said second digital address;

means for executing an instruction included in said first portion of deciphered information so as to process data included in said second portion of deciphered information; and means for addressing a successor portion of enciphered information for deciphering by said deciphering means in accordance with said third digital address.

4. A device for ciphering a block of data bits stored in a plurality of blocks thereof, each block having a digital address, the ciphering device comprising:

means for specifying the digital address of a block of data bits in said plurality thereof;

first product block ciphering means for transforming a first portion of said block of data bits to produce first substitute data;

means for modifying a second portion of said block of data bits in accordance with said first substitute data to produce first modified data;

second product block ciphering means for transforming said first modified data to produce second substitute data;

means for modifying said first portion of said block of data bits in accordance with said second substitute data to produce second modified data; and means for controlling operation of at least one of said first and second product block ciphering means in accordance with the specified digital address of said block of data bits.

5. The device of claim 4, wherein at least one of said first and second product block ciphering means operates under control of an encryption key.

6. A device for ciphering a block of data bits stored in a plurality of blocks thereof, each block having a digital address, the ciphering device comprising:

means for specifying the digital address of a block of data bits in said plurality thereof;

product block ciphering means for transforming a first portion of said block under control of the digital address of said block to produce first substitute data;

means for modifying a second portion of said block in accordance with said first substitute data to produce first modified data;

product block ciphering means for transforming said first modified data to produce second substitute data;

means for modifying said first portion of said block in accordance with said second substitute data to produce second modified data, wherein said first and second modified data constitutes a product block cipher of said block of data bits.

7. A device for ciphering a block of data bits stored in a plurality of blocks thereof, each block having a digital address, the ciphering device comprising:

means for specifying the digital address of a block of data bits in said plurality thereof;

product block ciphering means for transforming a first portion of said block to produce first substitute data;

means for modifying a second portion of said block in accordance with said first substitute data to produce first modified data;

product block ciphering means for transforming said first modified data under control of the digital address of said block to produce second substitute data;

means for modifying said first portion of said addressed block in accordance with said second substitute data to produce second modified data, wherein said first and second modified data constitutes a product block cipher of said block of data bits.

8. A device for deciphering a block of enciphered information, the device comprising:

product block ciphering means for transforming multiple-bit argument data to produce multiple-bit product data in which each bit of product data is a function of every bit of argument data;

means for presenting a first portion of said enciphered block as argument data to said product block ciphering means to produce first substitute data;

means for modifying a second portion of said enciphered block in accordance with said first substitute data to produce first modified data;

means for presenting said first modified data as argument data to said product block ciphering means to produce second substitute data;

means for modifying said first portion of said enciphered block in accordance with said second substitute data to produce second modified data;

means for presenting said second modified data as argument data to said product block ciphering means to produce third substitute data;

means for modifying said first modified data in accordance with said third substitute data to produce third modified data;

means for presenting said third modified data as argument data to said product block ciphering means to produce fourth substitute data;

means for modifying said second modified data in accordance with said fourth substitute data to produce fourth modified data, wherein said third and fourth modified data constitute a deciphered block of information.

9. A device for deciphering a block of enciphered information, the device comprising:

means for storing a first digital key;

means for storing a second digital key;

product block ciphering means for transforming multiple-bit argument data to produce multiple-bit product data in which each bit of product data is a function of every bit of argument data;

means for modifying a first portion of a block of enciphered information in accordance with said first digital key to produce first modified data;

means for presenting said first modified data as argument data to said product block ciphering means to produce first substitute data;

means for modifying a second portion of said block of enciphered information in accordance with said first substitute data to produce second modified data;

means for presenting said second modified data as argument data to said product block ciphering means to produce second substitute data;

means for modifying said first modified data in accordance with said second substitute data to produce third modified data;

means for presenting said third modified data as argument data to said product block ciphering means to produce third substitute data;

means for modifying said second modified data in accordance with said third substitute data to produce fourth modified data;

means for modifying said fourth modified data in accordance with said second digital key to produce fifth modified data, wherein said third and fifth modified data constitute a block of deciphered information.

10. A cryptographic apparatus for executing a computer program of instructions stored as addressable blocks of enciphered program information, and for processing data stored as addressable bytes of enciphered information, each block and byte having a digital address, the apparatus comprising:

means for deciphering a block of said enciphered program information to produce a queue of deciphered instructions in said program;

means for addressing in said queue a deciphered instruction having an executable portion and an address portion;

means for generating from said address portion a digital address of a byte of enciphered data;

means for scrambling said digital address to produce a scrambled address;

means for combining said scrambled address with said byte of enciphered data to produce a byte of deciphered data; and means for decoding and executing said executable portion of said deciphered instruction to process said byte of deciphered information.

11. A cryptographic apparatus for executing a computer program of instructions stored in enciphered form as a plurality of addressable blocks of enciphered information, each block being stored at a location specified by a digital address, the apparatus comprising:

means for storing an encryption key;

means for specifying a first digital address of a block of said enciphered information, thereby addressing the block;

product block deciphering means for transforming in a plurality of steps said addressed block of enciphered information to produce a block of deciphered information including an executable instruction and a second digital address, at least one step in said plurality of steps being controlled by said first digital address, and at least one step in said plurality of steps being controlled by said encryption key;

means for decoding and executing an instruction included in a block of said deciphered information;

means for computing a third digital address from said second digital address; and means for obtaining a successor block of said enciphered information from a location specified by said third digital address for deciphering by said deciphering means.

12. A cryptographic apparatus for executing a computer program of instructions stored in enciphered form as a plurality of addressable portions of enciphered information, each portion being stored at a location specified by a digital address, the apparatus comprising:

address register file means for storing a plurality of digital addresses, each address corresponding to at least one portion of said enciphered information;

key register file means for storing a plurality of encryption keys, each key corresponding to a digital address in said address register file;

means for accepting password information;

means for activating one of said encryption keys under control of said password information;

means for addressing a first portion of said enciphered information using the digital address in said address register file corresponding to said activated key in said key register file;

deciphering means for cryptographically transforming said addressed portion of enciphered information to produce a portion of deciphered information under control of said activated key, the portion of deciphered information including an executable instruction and a second digital address;

means for executing an instruction included in a portion of said deciphered information; and means for addressing a successor portion of enciphered information for deciphering by said deciphering means in accordance with said second digital address.

13. A cryptographic apparatus for executing a computer program of instructions stored in enciphered form as a plurality of addressable blocks of enciphered information, each block being stored at a location specified by a digital address, the apparatus comprising:

means for storing an encryption key;

means for specifying a first digital address of a block of said enciphered information, thereby addressing the block;

means for storing an alternative block of enciphered patch information;

product block deciphering means for transforming in a plurality of steps said block of patch information in lieu of said addressed block to produce a block of deciphered information including an executable instruction and a second digital address, at least one step in said plurality of steps being controlled by said first digital address, and at least one step in said plurality of steps being controlled by said encryption key;

means for decoding and executing an instruction included in a block of said deciphered information; and means for obtaining a successor block of said enciphered information from a location specified by said second digital address for deciphering by said deciphering means.

14. A cryptographic apparatus for executing a multi-level security system of computer programs of instructions stored in enciphered form as a plurality of addressable portions of enciphered information, each portion being stored at a location specified by a digital address, the apparatus comprising:

address register file means for storing a plurality of digital addresses, each address corresponding to at least one portion of said enciphered information in one security level of the system;

key register file means for storing a plurality of encryption keys, each key corresponding to a digital address in said address register file;

security kernel means for selecting an encryption key in said key register file and for selecting a corresponding digital address in said address register file, thereby transferring program execution to a predetermined security level of said system;

means for addressing a portion of said enciphered information using said selected digital address;

deciphering means for cryptographically transforming said addressed portion of enciphered information to produce a portion of deciphered information under control of said selected encryption key and under control of said selected digital address, the portion of deciphered information including an executable instruction and a second digital address;

means for executing an instruction included in a portion of said deciphered information; and means for addressing a successor portion of enciphered information for deciphering by said deciphering means in accordance with said second digital address.

15. A cryptographic microprocessor apparatus for executing a plurality of enciphered programs, each program being stored as a plurality of addressable portions of enciphered information, the apparatus comprising:

key register means for storing a plurality of encryption keys, each key corresponding to a program in said plurality of enciphered programs;

means for selecting a deciphering key from said plurality of encryption keys as a function of activating information;

means for deciphering a portion of said enciphered information under control of said deciphering key to produce a portion of deciphered program information including an executable instruction and a digital address;

means for executing an instruction included in a portion of said deciphered information; and means for addressing a successor portion of said enciphered information in accordance with said digital address for deciphering by said deciphering means.

16. A cryptographic microprocessor apparatus for executing a plurality of enciphered programs, each program being stored as a plurality of addressable blocks of enciphered information, the apparatus comprising:

key register means for storing a plurality of encryption keys, each key corresponding to a program in said plurality of enciphered programs;

means for selecting a deciphering key from said plurality of encryption keys as a function of activating information;

means for specifying the digital address of a block of said enciphered information;

means for deciphering said addressed block of enciphered information as a function of said digital address under control of said deciphering key to produce a block of deciphered program information including an executable instruction and a second digital address;

means for executing an instruction included in a block of said deciphered information; and means for addressing a successor block of said enciphered information for deciphering by said deciphering means as a function of said second digital address.

* * * * *